Oct. 27, 1931.  A. L. RAVEN  1,828,749
MOTION PICTURE SCREEN
Filed July 11, 1930  2 Sheets-Sheet 1
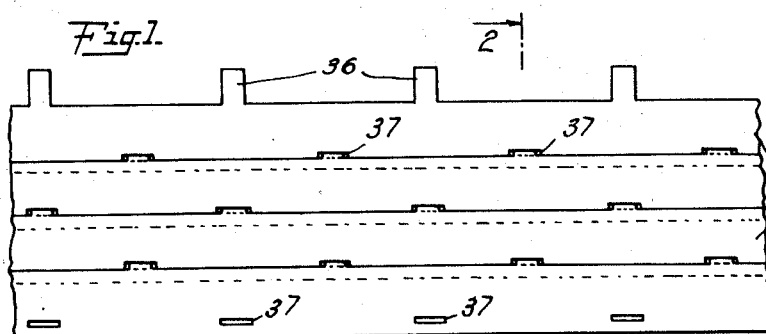
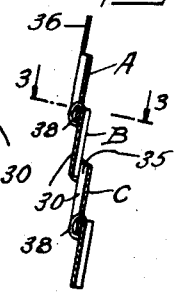
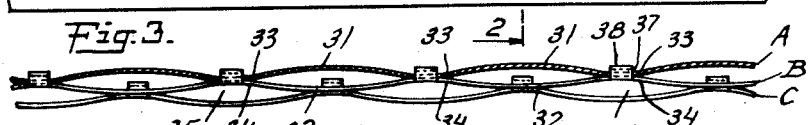
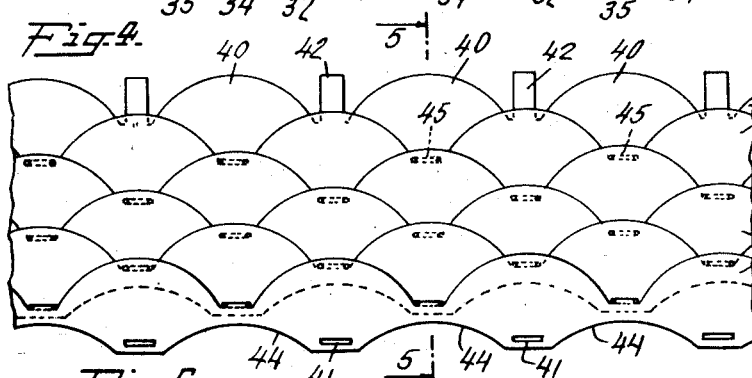
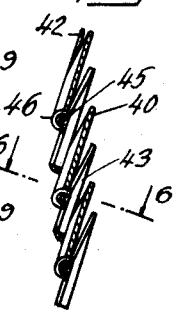
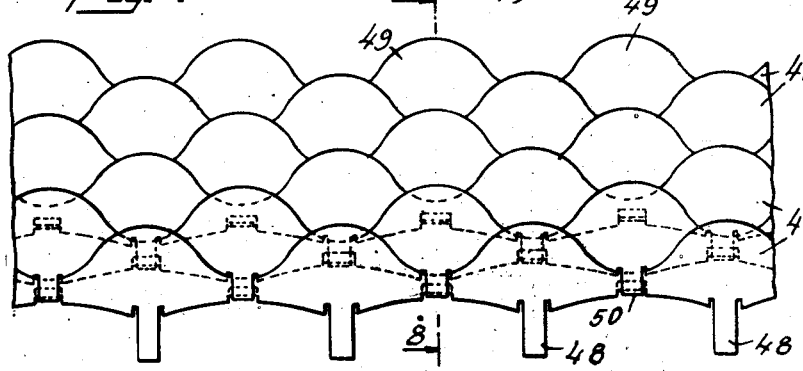
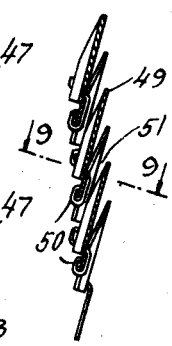
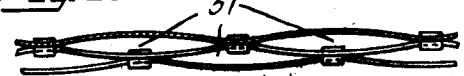
INVENTOR
Albert L. Raven
BY
Pennie, Davis, Marvin & Edmonds
His ATTORNEYS Oct. 27, 1931. A. L. RAVEN 1,828,749
MOTION PICTURE SCREEN
Filed July 11, 1930 2 Sheets-Sheet 2
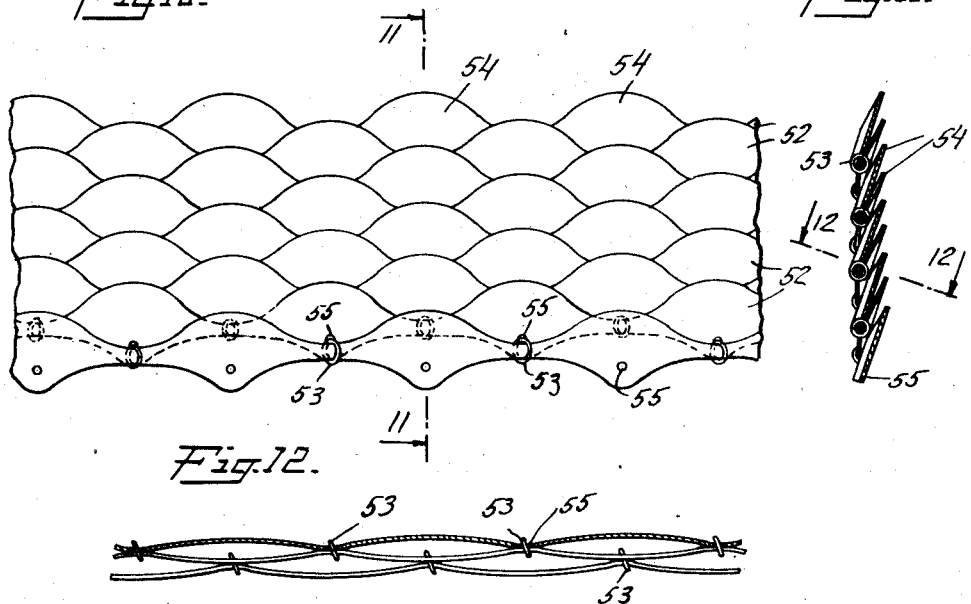
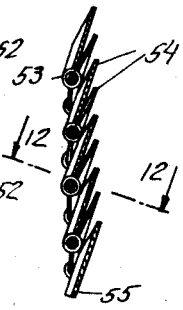
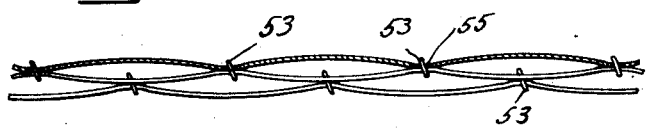
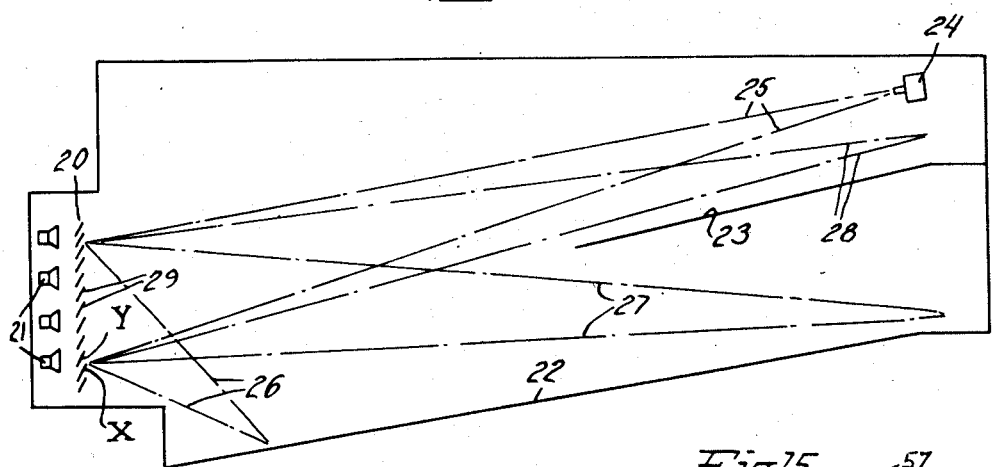
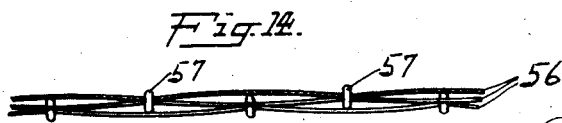
INVENTOR
Albert L. Raven
BY
Pennie, Davis, Marvin & Edmonds
His ATTORNEYS Patented Oct. 27, 1931

1,828,749

UNITED STATES PATENT OFFICE

ALBERT L. RAVEN, OF MOUNT VERNON, NEW YORK

MOTION PICTURE SCREEN

Application filed July 11, 1930. Serial No. 467,149.

The present invention relates to picture screens intended for the showing of pictures accompanied by sound.

In order to properly show pictures accompanied by sound, and particularly talking motion pictures, it has been found necessary to have the sound transmitted through the picture screen itself rather than by placing the loud speakers around the edges of the screen. By placing the loud speakers directly behind the screen and providing a properly constructed screen, the sound, for example the voices of the actors in a talking motion picture, appears to proceed more nearly from the mouth of the person speaking. This is of particular importance with the advent of pictures which are shown on extremely large sized screens.

The proper construction of such a screen presents a number of problems. Both the proper reflection of the picture projected upon the screen must be provided for, and the screen should be so made that the sound will readily pass through it without being muffled or modified so as to change undesirably the character of the sound, whether speech or music. The screen must function efficiently in both of these ways so that the transmission of the sound will not affect the reflection of the picture, and vice versa.

It is important, furthermore, that the screen be easy to support in the theatre, readily hang smooth in a single plane without wrinkling, be fire proof, and be so constructed that it will collect as little dust as possible and be susceptible of being cleaned easily from time to time.

Another important consideration is that the screen be practicable to manufacture, and the manufacturing cost low.

The object of the present invention is to provide a screen which will meet these requirements, among others, and the invention will be understood from a consideration of the accompanying drawings and the following description. There are illustrated in these drawings a number of embodiments of my invention but it is to be understood that the following is an exemplifying disclosure, merely, and the construction of the screen may be modified from the examples shown without going beyond the invention which extends to the scope of the appended claims.

In these drawings,

Fig. 1 is a front elevation of a small section of one form of my improved screen;

Fig. 2 is a vertical section taken on line 2—2 of Fig. 1;

Fig. 3 is a horizontal section taken on line 3—3 of Fig. 2;

Fig. 4 is a front elevation of a small section of screen of modified construction;

Fig. 5 is a vertical section taken on line 5—5 of Fig. 4;

Fig. 6 is a horizontal section taken on line 6—6 of Fig. 5;

Fig. 7 is a front elevation of a small section of a screen showing another modification;

Fig. 8 is a vertical section taken on line 8—8 of Fig. 7;

Fig. 9 is a horizontal section taken on line 9—9 of Fig. 8;

Fig. 10 is a front elevation of a small section of screen shown in further modification;

Fig. 11 is a vertical section taken on line 11—11 of Fig. 10;

Fig. 12 is a horizontal section taken on line 12—12 of Fig. 11;

Fig. 13 is a diagrammatic vertical section of a theatre auditorium;

Fig. 14 is a horizontal section similar to Fig. 12 showing a screen similar to that of Fig. 10 but having somewhat narrower sound passages; and Fig. 15 is a view of a detail.

Referring first to Fig. 13, the sound screen 20 is appropriately hung at the front of the auditorium with preferably a plurality of loud speakers 21 arranged behind it. The orchestra floor is indicated at 22, the balcony floor at 23, and the projector at 24. The broken lines 25 indicate the boundary rays from the projector. The broken lines 26 indicate the boundary rays coming from the upper and lower edges of the picture respectively to a person situated in the front row of the orchestra. Lines 27 indicate the boundary rays coming to a person at the rear of the orchestra, and lines 28 the boundary rays coming to a person in the balcony.

My improved sound screen is constructed of elements 29 arranged to overlap one another in such a way as to prevent light from passing through the screen and also to prevent any person in the audience from being able to see through the screen, or to see shadows cast by the overlapping elements. The edges of the elements extend generally in a horizontal direction across the face of the screen. The extent of the overlap must be sufficient to prevent the lower boundary ray 25 from the projector from passing through the screen, and also to prevent an observer in the balcony from being able to see through the screen along the lower boundary ray 28.

The elements are overlapped so that the apertures between them pass upwardly from the rear toward the front of the screen, and hence the shadows cast by the individual elements will be invisible to the spectators. Considering, for example, any two individual elements X and Y, the shadow cast by the upper edge of element X will fall on element Y at a point below the upper edge of element X. Hence it is invisible to any observer positioned below the lower boundary ray 25 from the projector.

Referring now to Figures 1 to 3 inclusive of the accompanying drawings, the sound screen here shown comprises a plurality of horizontal strips 30. Each of these strips is slightly corrugated or possessed of an undulating or wavy form, as may be seen in the horizontal sectional view of Fig. 3. The upper and lower edges of the strips 30 are straight and parallel to one another, and overlap each other slightly as indicated by the dotted lines in Figure 1. Hence the surfaces of the strips are positioned at an angle to the plane of the screen, as may be seen from Figure 2.

In this slightly overlapping relation the peaks of the waves or corrugations of adjacent strips are arranged opposite one another. Thus, for example, as may be seen from Figures 2 and 3, the bulges 31 of the uppermost strip A are placed opposite the bulges 32 of the next lower strip B, and the reverse bulges or peaks 33 of the wavy or corrugated formations of strip A are opposite the similar peaks 34 of strip B.

The result of this arrangement of the undulating strips is that oblong spaces of considerable size occur between the bulges 31 and 32. Strip C, which is the third strip from the top is placed in the same position with respect to strip B as strip B is with respect to strip A, so that similar oblong spaces 35 occur between these strips. Inasmuch as the entire screen is made up by arranging the strips in this manner, the screen is perforated throughout its area with these oblong passageways extending obliquely and upwardly from the rear toward the front of the screen.

The wavy or corrugated strips 30 may be held in the position just described in any suitable manner, but this is preferably accomplished by securing them together at the peaks 33 and 34 which naturally tend to lie in contact with one another. As shown in Fig. 1, the means of fastening comprises tongues and apertures on the upper and lower edges of the strips respectively. Thus the strips are provided with tongues 36 which project from their upper edges at spaced points coinciding with portions of the strip which are in contact with the strip next above, and with small rectangular apertures 37 which are arranged in staggered relation to tongues 36.

In assembling the strips to form the screen, the tongues 36 are inserted through the apertures 37 forming eyes 38 (Fig. 2) which surround the narrow margin of material between the apertures 37 and the lower edges of the strips. The apertures 37 are preferably spaced comparatively close to the lower edges of the strips, and the eyes 38 are made sufficiently large and loose so that these joints provide a considerable degree of flexibility. This permits the adjacent strips to turn with respect to one another throughout their length and enables the screen to be rolled up into a roll of sufficiently small diameter for convenient shipment or transportation.

Referring now to Figures 4, 5, and 6, the strips 39 of which this modified form of screen is composed, are of the particular outline shown instead of being strips with parallel straight edges like the strips 30. Strips 39 are provided with upwardly projecting lobes 40 which are uniformly spaced apart throughout the length of the strip and with corresponding spacing with the undulations or corrugations in the strip. In the lower edges of the strip directly beneath the tops of the lobes 40 are the apertures 41 which correspond with apertures 37.

Between the lobes 40 are the tongues 42 which correspond with the tongues 36, and by means of tongues 42 and apertures 41 the adjacent strips are secured together and the screen is built up as described in connection with figures 1 to 3 inclusive. The oblong sound passages 43 extending upwardly oblique to the plane of the screen from the rear toward the front are again present and are evenly distributed throughout the surface of the screen. In order to reduce the weight of the screen and to save material, and also to reduce the extent of the overlap and hence the length of the oblique sound passages 43, the bottom edges of the elements 39 are cut away as shown at 44.

In the modified form of the screen just described, the lobes 40 are of sufficient width to extend upwardly in front of the joints 45 which are formed by the tongues 42 being inserted through the apertures 41 and bent into eyes 46 similar to eyes 38 of Figure 2. Hence the joints 45 are concealed by the lobes 40.

In the additional modification shown in Figures 7 to 9 inclusive, the strips 47 are in general similar to the strips 39 in configuration, and they are again made in wavy or undulating form the same as strips 30. Strips 47, however, have the tongues and apertures in the reverse position to the tongues and apertures of strips 39. The tongues 48 of strips 47 are placed at the bottom edge of the strip and directly beneath the lobes 49. The lobes 49 are separated by narrow portions of the strip, and tongues 48, instead of passing through apertures in these narrow portions, completely embrace these narrow portions. The width of the narrow portions which are encircled by tongues 48 is shown in the drawings as being considerably wider than the margin of material left between the apertures 37 and 41 and the lower edges of their respective strips, and the tongues 48 are shown pressed down firmly at 50 in Fig. 8, thereby forming the strips into a solid unyielding sheet. If desired, however, the joints thus formed may be made to have sufficient looseness to permit the screen to be more readily rolled into a package as previously described.

In this form of screen as in the form shown in Fig. 4, the lobes 49 extend upwardly and conceal the joints by which the strips are secured together. Also elongated passageways 51 similar to passageways 43 and 35 extend upwardly from the rear toward the face of the screen and provide for the transmission of sound.

In the further modification shown in Figures 10, 11 and 12, the strips 52 are almost identical with strips 47 except for the means of securing the strips together. Instead of the tongue and slot connection used in the screens of Figs. 1, 4 and 7, the strips 52 are fastened together by means of rings 53 which embrace the narrow portions of the strip between the lobes 54 and pass through small holes 55 which are punched in the lower edges of the adjacent higher strip directly beneath the lobes therein. The oblique oblong passageways for sound are provided as in the other forms of screen and the ring joints are concealed by the lobes. The width of the narrow portions is substantially equal to the distance from the lower edge of the strip to the holes 55. The flexibility of this form of screen can be varied by varying the size and shape of the rings 53.

The strips of which the screens above described are composed may be made of any suitable material which is sufficiently rigid to maintain the corrugated formation. They therefore may be made of composite fabric material which is stiffened by the addition of suitable adhesive or stiffening compositions. The strips may also be made of molded compositions, vulcanized fibre, and the like. It is important, however, that a material be chosen which is inherently fire resisting and preferably fireproof, and the preferred material is a thin metal of light weight such for example as aluminum.

Referring now to Fig. 14, the screen here shown is made up of strips of similar contour to the strips of the screen shown in Fig. 10. The strips do not, however, have a wavy or corrugated form imparted thereto prior to being made up into a screen. The strips 56 are made of resilient material such for example as spring steel, and they are secured together by rings or links 57, these links being preferably of oblong shape as illustrated in Fig. 15. Rings 57 pass through an aperture near the lower edge of one strip and around a narrow portion of the strip in the next lower row so that the fastening together of adjacent strips is similar to the construction shown in Fig. 10.

Since the material of which strips 56 is composed is a resilient or springy material, the strips tend to lie close to one another throughout their length. They are prevented from doing this, however, by the outer portions of rings 57 so that elongated oblique apertures passing upwardly through the screen from the rear toward the front are provided, as in the other forms of screen. In order to enlarge these apertures somewhat, a wire of larger gauge is used for making the rings 57 than for the rings illustrated in the other figures.

The advantage of using oblong rings as illustrated in Fig. 15 is that by placing a joint between the ends of the ring in one of the upright portions, it is impossible for the thin sheet material to slip through the joint. It will be understood that oblong rings can be used in place of the round rings 53 of Fig. 10.

The screen may be coated with any light reflecting material desired, for example, for narrow theatres where most of the light is to be reflected within a small horizontal angle from the line of projection, the screen may be coated with specular material. Where, however, the screen is to be used in a wide theatre, and it is of importance that the picture be as bright as possible at wide angles horizontally from the axis of projection, the screen can be given a fine grained coating which will diffuse the light.

Such a coating may be given to the strips before they are made up into the screen, or after the screen is hung. With the screen of Figure 1, however, it is preferable to apply this coating after the hanging of the screen, because the joints between the strips formed by the tongues 36 and the apertures 37 are not concealed. One or more coats of lacquer, paint, or the like, applied to the face of the screen after assembling, in addition to imparting the desired light reflecting properties will also serve to fill the crevices left in these joints.

The result which it is desired to obtain with my improved screen is the effect of a screen which is from the projection standpoint a continuous unbroken flat surface similar to the screens used for non-sound pictures, and at the same time provide an extremely large number of sound passages through the screen which will effectively transmit the sound, and the screen of the invention accomplishes this result to a remarkable degree, even after the screen has been hanging long enough to have collected considerable dust upon the edges of the overlapping strips.

One of the reasons for this I attribute to the fact that the appearance of straight lines is entirely avoided in the modifications shown in Figures 4, 7 and 10, and the wavy character of the strips 30 of Fig. 1, together with the fact that the outward bulges in the strips are staggered vertically with respect to one another, lessens the visibility of the edges of the strips used in the screen of Figure 1.

It will be understood that in the accompanying drawings the strips have been illustrated to a very greatly enlarged scale in order to show their construction clearly, and that in the actual screens the strips are preferably so small that their outline can scarcely be distinguished a few feet from the screen. A person viewing a picture projected upon the screen is unconscious of the strip formation and the screen appears to have a uniform surface.

With the forms of screen illustrated in Figs. 4, 7 and 10, the texture of the screen is varied by the character of the lobes, these lobes appearing to intersect one another in adjacent strips in such a way as to produce broken or noncontinuous lines across the screen. Even when the strips of these forms of screen are of comparatively large size, however, their outline and arrangement is such that, from a short distance in front, the screen appears to have an agreeable texture. Moreover, a person viewing a picture projected upon it is unconscious of this texture.

A further advantage of the present screen is the ease with which it may be supported. Inasmuch as the elements, that is, the strips, extend crosswise of the screen, and preferably are long enough to carry throughout the entire width of the screen, they may be supported one by the other, and it is unnecessary to provide a framework at the sides of the screen for supporting the ends of the strips. The preferable means of support is to provide a rigid bar across the top of the screen to which the uppermost strip may be fastened at relatively frequent intervals. The screen will then hang freely in flat condition and properly to provide an excellent projection of the picture.

The construction of a sound screen after the manner above described, is a comparatively simple matter and the constructions included in the invention lend themselves to economical manufacture on a commercial scale. This has been considerable of a problem in producing a desirable screen for use with sound pictures. It is comparatively easy to make up a screen by hand which will give good projection results as well as transmit the sound without distortion or loss, but the cost of such screens is prohibitive. Even the cost of many of the screens heretofore proposed and which were capable of being manufactured by factory methods has been greater than the industry will stand. The screen constructions of the present invention, however, are of such a practicable nature as to avoid this difficulty.

In the appended claims the term "wavy" will be understood to include any strip which has a wavy or undulating front surface when in position in the screen, regardless of whether the natural shape of this strip before insertion in the screen is straight or corrugated.

I claim:—

1. A screen for the projection of pictures accompanied by sound comprising a plurality of wavy horizontal strips arranged in overlapping relation with the hollows of the waves of adjacent strips opposite one another and forming sound passages extending upwardly from the rear toward the front of the screen between the strips.

2. A screen for the projection of pictures accompanied by sound comprising a plurality of wavy horizontal strips arranged with the upper edge of each strip overlapping the lower edge of the next higher strip, and the peaks of the waves in said strips opposite one another, means for securing the strips to one another at said peaks whereby numerous sound passages are provided between said points of attachment extending upwardly from the rear toward the front of the screen.

3. A screen for the projection of pictures accompanied by sound comprising a plurality of wavy horizontal strips each having alternating wide and narrow portions, the strips being arranged with the wide portions of adjacent strips staggered with respect to one another and the peaks of said wavy formation in registry, and means for securing adjacent strips together at said peaks, adjacent strips overlapping one another and thereby forming sound passages extending upwardly from the rear toward the front of the screen, the undulating character of the strip formation and the varying width of the strips producing a pleasing screen texture.

4. A screen for the projection of pictures accompanied by sound comprising a plurality of wavy horizontal strips each having a plurality of upwardly projecting lobes, said strips being arranged with the lobes of adjacent strips staggered with respect to one another and the peaks of said wavy formation in registry, and means for securing adjacent strips together at said peaks, adjacent strips overlapping one another and thereby forming sound passages extending upwardly from the rear toward the front of the screen.

5. A screen for the projection of pictures accompanied by sound comprising a plurality of wavy horizontal strips each having alternating wide and narrow portions, the strips being arranged with the wide portions of adjacent strips staggered with respect to one another and the peaks of said wavy formation in registry, and rings connecting adjacent strips together at said peaks, said adjacent strips overlapping one another and thereby forming sound passages extending upwardly from the rear toward the front of the screen.

6. A screen for the projection of pictures accompanied by sound comprising a plurality of wavy horizontal strips each having alternating wide and narrow portions corresponding in spacing to the wavy formation, the strips being arranged with the wide portions of adjacent strips staggered with respect to one another and the peaks of said wavy formation in registry, the strips being provided with holes near their lower edges opposite said wide portions and rings passing through said holes and around said narrow portions for securing the strips together, adjacent strips overlapping one another and thereby forming sound passages extending upwardly from the rear toward the front of the screen.

7. A screen for the projection of pictures accompanied by sound comprising a plurality of wavy horizontal strips each having alternating wide and narrow portions corresponding in spacing to the wavy formation, the strips being arranged with the wide portions of adjacent strips staggered with respect to one another and the peaks of said wavy formation in registry, the strips being provided with holes near their lower edges opposite said wide portions, and rings passing through said holes and around the narrow portions of the next strip below, the outer portions of said rings being in contact with the rear of the wide portions of the strip in the second row below and serving to separate said strips and maintain the said wavy formation therein so as to form sound passages extending upwardly from the rear toward the front of the screen.

8. A screen for the projection of pictures accompanied by sound comprising a plurality of wavy horizontal strips having undulating upper and lower edges, the strips being arranged with the wide portions formed by said undulating edges staggered with respect to one another, and with the peaks of said wavy formation in registry, and means for securing adjacent strips together in overlapping relation thereby forming sound passages extending upwardly from the rear toward the front of the screen.

9. A screen for the projection of pictures accompanied by sound comprising a plurality of wavy horizontal strips arranged with the upper edge of each strip overlapping the edge of the next higher strip, and the peaks of the waves of said strips opposite one another, and means for securing said strips to one another at said peaks comprising apertures arranged in spaced relation along one edge of each strip, and tongues arranged in spaced relation along the opposite edge of said strip and staggered with respect to the said apertures, said tongues and apertures being adapted to engage one another to hold the adjacent strips together.

10. A screen for the projection of pictures accompanied by sound comprising a plurality of wavy horizontal strips arranged with the upper edge of each strip overlapping the lower edge of the next higher strip and the peaks of the waves in said strips opposite one another, adjacent strips being in engagement with one another at said peaks, whereby numerous sound passages are provided between said points of engagement extending upwardly from the rear to the front of the screen.

In testimony whereof I affix my signature.

ALBERT L. RAVEN.